(12) United States Patent
Nashimoto

(10) Patent No.: US 6,862,393 B2
(45) Date of Patent: Mar. 1, 2005

(54) OPTICAL WAVEGUIDE ELEMENT, MANUFACTURING METHOD FOR OPTICAL WAVEGUIDE ELEMENT, OPTICAL DEFLECTING ELEMENT, AND OPTICAL SWITCHING ELEMENT

(75) Inventor: Keiichi Nashimoto, Ayase (JP)

(73) Assignee: Nozomi Photonics Co., Ltd., Tokyo (JP)

(*) Notice: Subject to any disclaimer, the term of this patent is extended or adjusted under 35 U.S.C. 154(b) by 0 days.

(21) Appl. No.: 10/290,214

(22) Filed: Nov. 8, 2002

(65) Prior Publication Data

US 2003/0081900 A1 May 1, 2003

Related U.S. Application Data

(62) Division of application No. 09/799,499, filed on Mar. 7, 2001, now Pat. No. 6,529,667.

(30) Foreign Application Priority Data

Mar. 15, 2000 (JP) ...................................... 2000-073042

(51) Int. Cl.[7] .............................................. G02B 6/10
(52) U.S. Cl. ..................................................... 385/129
(58) Field of Search ......................... 385/14, 129, 130, 385/131, 132, 43

(56) References Cited

U.S. PATENT DOCUMENTS

| | | | |
|---|---|---|---|
| 5,172,258 A | 12/1992 | Verber ......................... | 359/138 |
| 5,323,476 A | * 6/1994 | Mueller et al. ............... | 385/43 |
| 5,703,989 A | 12/1997 | Khan et al. .................. | 385/130 |
| 5,738,798 A | 4/1998 | Leonard ....................... | 216/24 |
| 6,052,397 A | 4/2000 | Jeon et al. .................... | 372/46 |
| 6,240,233 B1 | 5/2001 | Weinert et al. ............. | 385/131 |
| 6,350,622 B2 | 2/2002 | Misewich et al. ............. | 438/2 |
| 6,483,967 B2 | 11/2002 | Tang et al. .................... | 385/43 |
| 6,600,847 B2 | 7/2003 | Saini et al. ................... | 385/14 |

FOREIGN PATENT DOCUMENTS

| | | |
|---|---|---|
| JP | A 5-182948 | 7/1993 |
| JP | A 7-78508 | 3/1995 |
| JP | A 9-61652 | 3/1997 |

OTHER PUBLICATIONS

Nishihara et al., "Optical Integrated Circuits," Ohmsha, Ltd., 1993, pp. 195–230.
Kawachi, M., "Current Status and Future Trends in Planar Lightwave Circuit Technologies," NTT Opto–Electronics Laboratories, NTT R&D, vol. 43, No. 11, 1994, pp. 1273–1280.

* cited by examiner

*Primary Examiner*—Javaid H. Nasri
(74) *Attorney, Agent, or Firm*—Oliff & Berridge, PLC

(57) ABSTRACT

An optical waveguide element capable of being coupled with optical fibers at high coupling efficiency is to be provided. Also an optical waveguide element manufacturing method permitting accurate production of such optical waveguide elements is to be provided. The optical waveguide element is provided with a buffer layer formed over a monocrystalline substrate and an optical waveguide layer formed over the buffer layer, and a recess is formed in the buffer layer along the lengthwise direction of the monocrystalline substrate. The optical waveguide layer is provided to fit into this recess to form a channel optical waveguide. Over the upper face of the optical waveguide layer on the light incidence side and the light emission side, a cladding layer whose refractive index is smaller than that of the optical waveguide layer and whose thickness increases towards the end face(s) in a flared shape is provided in the same width as that of the monocrystalline substrate. By providing the cladding layer whose refractive index is smaller than that of the optical waveguide layer, it is made possible to expand the mode field diameter and substantially reduce the coupling loss between the optical fiber and the optical waveguide element. Further by increasing the thickness of the cladding layer in a flared shape toward the end face(s), it is made possible to gradually compress the mode field diameter and to reduce the optical propagation loss within the optical waveguide.

10 Claims, 14 Drawing Sheets

OPTICAL WAVEGUIDE ELEMENT, MANUFACTURING METHOD FOR OPTICAL WAVEGUIDE ELEMENT, OPTICAL DEFLECTING ELEMENT, AND OPTICAL SWITCHING ELEMENT

BACKGROUND OF THE INVENTION

1. Field of the Invention

The present invention relates to an optical guide waveguide element, a manufacturing method for optical waveguide elements, an optical deflection element and an optical switching element, and more particularly to an optical waveguide element capable of being coupled with an optical fiber at high coupling efficiency and a manufacturing method for such optical waveguide elements, an optical deflection element and an optical switching element to which the optical waveguide element according to the invention is applied.

2. Description of the Related Art

Conventionally, glass such as silica, oxide ferroelectrics and electro-optical materials such as $LiNbO_3$, magneto-optical materials such as $Y_3Ga_5O_{12}$, polymers such as PMMA, and GaAs-based chemical compound semiconductors are used for planar optical waveguides. Among those materials, oxide ferroelectrics are known to manifest particularly satisfactory acousto-optical and electro-optical effects, but most of the actually produced acousto-optical elements and electro-optical elements use $LiNbO_3$.

There are a wide variety of oxide ferroelectrics including $LiNbO_3$, $BaTiO_3$, $PbTiO_3$, $Pb_{1-x}La_x(Zr_yTi_{1-y})_{1-x/4}O_3$ (which may be PZT, PLT or PLZT depending on the values of x and y), $Pb(Mg_{1/3}Nb_{2/3})O_3$, $KNbO_3$, $LiTaO_3$, $Sr_xBa_{1-x}Nb_2O_6$, $Pb_xBa_{1-x}Nb_2O_3$, $Bi_4Ti_3O_{12}$, $Pb_2KNb_5O_{13}$, and $K_3Li_2Nb_5O_{15}$, and many of them are superior in characteristics to $LiNbO_3$. Especially, $Pb_{1-x}La_x(Zr_yT_{1-y})_{1-x/4}O_3$ is known as a material having a much higher electro-optical coefficient than $LiNbO_3$. The electro-optical coefficient of $LiNbO_3$ monocrystals is 30.9 pm/V whereas that of PLZT (8/65/35: x=8%, y=65%, 1-y=35%) ceramic is as high as 612 pm/V.

The reason why most of the elements actually produced $LiNbO_3$ or $LiTaO_3$, in spite of the availability of many ferroelectrics with better characteristics than $LiNbO_3$, is that monocrystal growth technology and waveguide formation technology by Ti diffusion to wafers or proton exchange are well established for $LiNbO_3$ and $LiTaO_3$, while thin films need to be by epitaxial for other materials than $LiNbO_3$ and $LiTaO_3$, and conventional vapor-phase cannot provide thin film optical waveguides of high enough quality for practical use.

The present inventors, with a view to solving this problem, proposed a solid phase epitaxial growth technique capable of providing thin film optical waveguides of high enough quality for practical use (Japanese Published Unexamined Patent Application No. Hei 7-78508), but an epitaxially grown thin film optical guide often has to be thinner than the mode field diameter of the optical fiber on account of the requirement for singleness of the mode or that to reduce the drive voltage, inviting an increased loss in coupling with the optical fiber.

Previously, regarding semiconductor optical waveguides and silica-based waveguides, techniques to provide a flared optical waveguide in the position of connection to the optical fiber to reduce the coupling loss between the optical waveguide and the optical fiber were proposed in Japanese Published Unexamined Patent Application No. Hei 9-61652 and Japanese Published Unexamined Patent Application No. Hei 5-182948 among others.

However, there is no technique available for producing a fine pattern in the epitaxially grown oxide thin film optical waveguide, making it difficult to fabricate the optical waveguide in a flared shape. For $LiNbO_3$ monocrystalline wafers for example, a fabrication method for three-dimensional optical waveguides to which Ti diffusion and proton exchange are described by Nishibara, Haruna and Suhara in a publication on optical integrated circuits by Ohmsha (1993) pp. 195–230, but no method for other elements or exchanging ions is known for other materials, especially $Pb_{1-x}La_x(Zr_yTi_{1-y})_{1-x/4}O_3$. For silica-based optical waveguides and the like, a method for producing channel optical waveguides by reactive ion etching is disclosed by Kawachi in *NTT R&D*, 43 (1994)1273 and elsewhere, but it is difficult to accomplish selectively etch a monocrystalline epitaxial ferroelectric thin film optical waveguide without roughing its surface, which would invite scattering loss or damaging the substrate, which is an oxide of the same kind as the thin film optical waveguide. For this reason, no report is found on the successful fabrication of any relatively loss-free channel optical waveguide into an epitaxial ferroelectric thin film optical waveguide. Furthermore, there is another problem that merely flaring an epitaxially grown oxide thin film optical waveguide can hardly prevent the waveguide mode from becoming multi-mode.

SUMMARY OF THE INVENTION

The present invention, therefore, provides an optical waveguide element which can be coupled with an optical fiber at high coupling efficiency. The invention also provides a manufacturing method for optical waveguide elements which can be coupled with optical fibers at high coupling efficiency. The invention further provides an optical switching element and an optical deflection element enabled to achieve coupling with an optical fiber at high coupling efficiency by applying the optical waveguide element according to the invention.

In order to achieve one of these intentions, an optical waveguide element according to an aspect of the invention is provided with an optical waveguide layer having an optical waveguide, and a cladding layer which is provided over at least one of the incidence end and the emission end of the optical waveguide on the surface of the optical waveguide layer, has a lower refractive index than that of the optical waveguide layer, and gradually increases in thickness towards the end(s) in a flared shape.

According to another aspect of the invention, there is provided an optical waveguide element manufacturing method for manufacturing optical waveguide elements by forming, over the surface of an optical waveguide layer provided with an optical waveguide, an amorphous thin film whose refractive index is smaller than that of the optical waveguide layer, shaping the amorphous thin film over at least one of the incidence end and the emission end of the optical waveguide to leave a flared part whose thickness increases towards the end(s), and forming the shaped amorphous thin film into a cladding layer by solid phase epitaxial growth.

Another manufacturing method for optical waveguide elements to another aspect of the invention includes an optical waveguide formation step to shape an amorphous thin film formed over the surface of a monocrystalline substrate into a prescribed channel pattern, form a buffer layer by subjecting the amorphous thin film so shaped to solid phase epitaxial growth, and form a channel optical waveguide by solid phase epitaxial growth of an optical waveguide layer over the buffer layer, and a cladding layer formation step to form an amorphous thin film whose refractive index is smaller than that of the optical waveguide layer over the surface of the optical waveguide layer provided with the optical waveguide, shape the amorphous thin film over at least one of the incidence end and the emission end of the optical waveguide to leave a flared part whose thickness increases towards the end(s), and form a cladding layer by subjecting the amorphous thin film so shaped to solid phase epitaxial growth by heating.

An optical deflection element includes an optical waveguide layer having an epitaxial or single-oriented electro-optical effect, provided over an electroconductive or semi-electroconductive monocrystalline substrate to serve as a lower electrode or over a substrate over the surface of which is formed an electroconductive or semi-electroconductive monocrystalline substrate to serve as a lower electrode; a light beam controlling electrode which is arranged over the optical waveguide layer and forms, between the optical waveguide layer and the monocrystalline substrate or the monocrystalline thin film, a region having a refractive index varying with the voltage applied and deflecting a light beam which propagates through the optical waveguide layer according to the voltage applied; and a cladding layer which is formed over at least one of the incidence end and the emission end of the optical waveguide over the surface of the optical waveguide layer and has a smaller refractive index than that of the optical waveguide layer, and whose thickness gradually in towards the end(s) in a flared shape.

An optical switching element according to another aspect of the invention includes an optical waveguide layer having an epitaxial or single-oriented electro-optical effect, provided over an electroconductive or semi-electroconductive monocrystalline substrate to serve as a lower electrode or over a substrate over the surface of which is formed an electroconductive or semi-electroconductive monocrystalline substrate to serve as a lower electrode; an optical waveguide formed in the optical waveguide and having at least one branched part; upper electrodes one of which is provided for each branch of the branched part; and a cladding layer which is formed over at least one of the incidence end and the emission end of the optical waveguide over the surface of the optical waveguide layer and has a smaller refractive index than that of the optical waveguide layer, and whose thickness gradually increases towards the end(s) in a flared shape.

As described above, the optical waveguide element according to one aspect of the invention has, over at least one of the incidence end and the emission end of the optical waveguide over the source of the optical waveguide layer, a cladding layer which has a smaller refractive index than that of the optical waveguide layer and whose thickness gradually increases towards the end(s) in a flared shape.

Thus, by providing a cladding layer whose refractive index is smaller than that of the optical waveguide layer over the optical waveguide it is made possible to expand the diameter of the mode field in the optical waveguide and thereby substantially reduce the coupling loss between the optical fiber and the optical waveguide element. Furthermore, the shape of the cladding layer whose thickness gradually increases towards the end(s) over at least one of the incidence end and the emission and of the optical waveguide can also help reduce to light propagation loss in the optical waveguide element to a negligible level.

The manufacturing method for optical waveguide elements according to another aspect of the invention, make it easier to shape the layer and enables optical waveguide elements to be produced more precisely than where a thin film obtained by solid phase epitaxial growth is shaped, because first an amorphous thin film having a smaller refractive index than that of the optical waveguide layer is formed over the surface of the optical waveguide layer provided with an optical waveguide, then this amorphous thin film is so shaped as to leave a flared part whose thickness increases towards the end(s) over at least one of the incidence end and the emission end of the optical waveguide, and the shaped amorphous thin film is further formed into a flared shape through solid phase epitaxial growth by heating.

Another manufacturing method for optical waveguide elements according to still another aspect of the invention, make possible, in addition to the formation of the cladding layer in the same manner as the foregoing manufacturing method for optical waveguide elements, shaping of an amorphous thin film formed over the surface of the monocrystalline substrate into a prescribed channel pattern, formation of the shaped amorphous thin film into a buffer layer by solid phase epitaxial growth, and formation of a channel optical waveguide through solid phase epitaxial growth of an optical waveguide layer over this buffer layer, resulting in an optical waveguide element having a fine pattern of the channel optical waveguide, whose side walls and surface are smooth and which is hardly susceptible to scattering loss.

BRIEF DESCRIPTION OF THE DRAWINGS

These and other objects of the present invention will become apparent from the following detailed description of the preferred embodiments thereof when taken in conjunction with the accompanying drawings, wherein.

DETAILED DESCRIPTION OF THE PREFERRED EMBODIMENTS (First Embodiment)

Figure 1A:
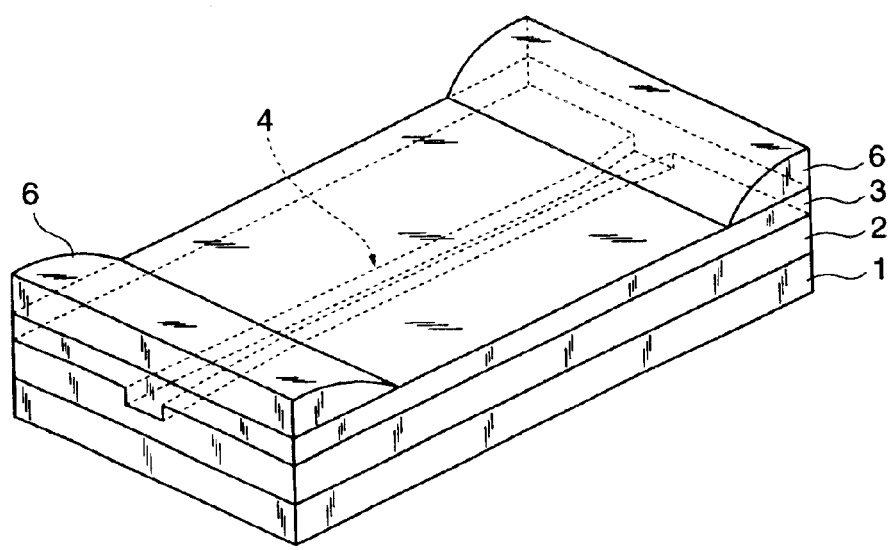
FIG. 1A is a perspective view of an optical waveguide element, which is a first embodiment of the invention, and FIG. 1B, a profile of 1A.
Figure 1B:
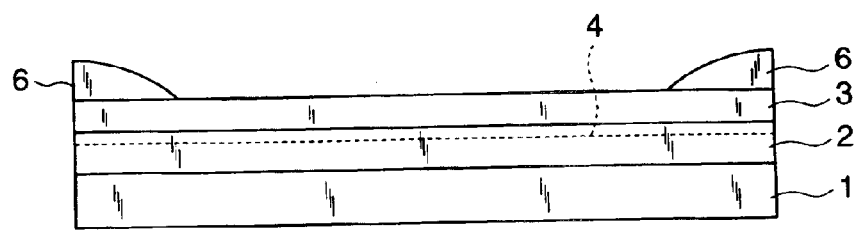

The optical waveguide element, which is the first embodiment of the invention, will be described. As illustrated in FIGS. 1A and 1B, this optical waveguide element is provided with a buffer layer 2 formed over a monocrystalline substrate 1 and an optical waveguide layer 3 formed over the buffer layer 2. In the buffer layer 2, a recess is formed in the lengthwise direction of the monocrystalline substrate 1, and the width of this recess gradually increases towards the ends over the incidence end and the emission end. An optical waveguide layer 3 is provided to be fitted into this recess to form a channel optical waveguide 4.

The channel width of the linear part of the channel optical waveguide 4 may instance, 5 $\mu$m. The mode field diameter of the channel optical waveguide 4 whose channel width is 5 $\mu$m will be 6.2 $\mu$m in the direction towards inside the substrate surface and 2.2 $\mu$m in the direction normal to the substrate surface, and the coupling loss with a single mode optical fiber of 9.5 $\mu$m in mode field diameter will be 4.2 dB. The width of the flared part connected to this linear part should desirably be greater than the channel width of the linear part by 1 $\mu$m to 10 $\mu$m; the width the flare shape may expand to, for example, from 5 $\mu$m to 8 $\mu$m over a length of 1000 $\mu$m. To each end of the flared part, a linear channel optical waveguide may be further connected to serve as a margin for machining.

Over the upper face of the light incidence side and the light emission side the optical waveguide layer 3 is provided, in the same width as the monocrystalline substrate 1, a cladding layer 6 of which the refractive index is smaller than that of the optical waveguide layer and the thickness increases in a flared shape towards each end. By providing in this way the cladding layer 6 whose refractive index is slightly lower than that of the optical waveguide layer 3 over the optical waveguide layer 3, the mode field diameter can be expanded to substantially reduce the coupling loss between the optical fiber and the optical waveguide element. Moreover, by increasing the thickness of the cladding layer 6 towards each end face in a flared shape, the mode field diameter can be expanded gradually, and thereby the light propagation loss within the optical waveguide can also be reduced.

The difference between the optical waveguide layer 3 and the cladding layer 6 in the refractive index should be preferably no less than 0.0001 and not more than 0.05. If the difference in the refractive index is smaller than 0.0001, the wave-guiding mode of the optical waveguide layer will become multiple, and the coupling loss with the single mode optical fiber will increase. On the other hand, if the difference in the refractive index is greater than 0.05, the mode field diameter will hardly expand.

Figure 2:
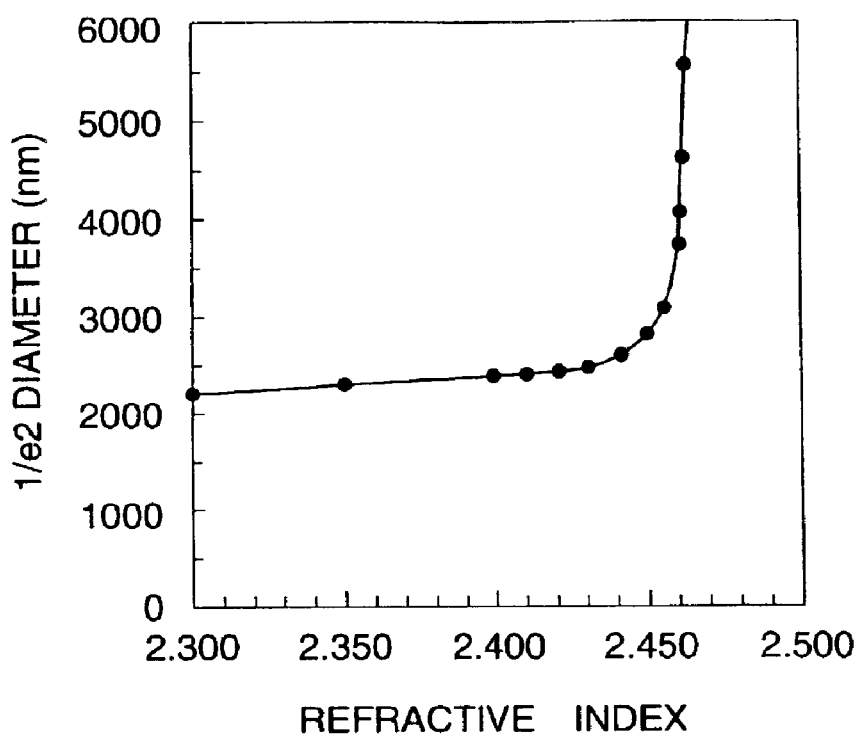
FIG. 2 is a graph illustrating the relationship between the reactive index of the cladding layer and the mode field diameter.

FIG. 2 illustrates an example of analysis of the relationship between the refractive index of the cladding layer 6 and the mode field diameter in the optical waveguide layer 3 provided with a slab type optical waveguide. It is seen from FIG. 2 that, as the refractive index of the cladding layer 6 approaches 2.468, the refractive index of the optical waveguide layer 3, the mode field gradually expands from around 2.420 and, when the refractive index reaches about 2.458, the mode field diameter increases acceleratedly. Therefore, where the difference in the refractive index between the optical waveguide layer 3 and the cladding layer 6 is kept 0.05 or less, an expanded mode field can be obtained.

Figure 3:
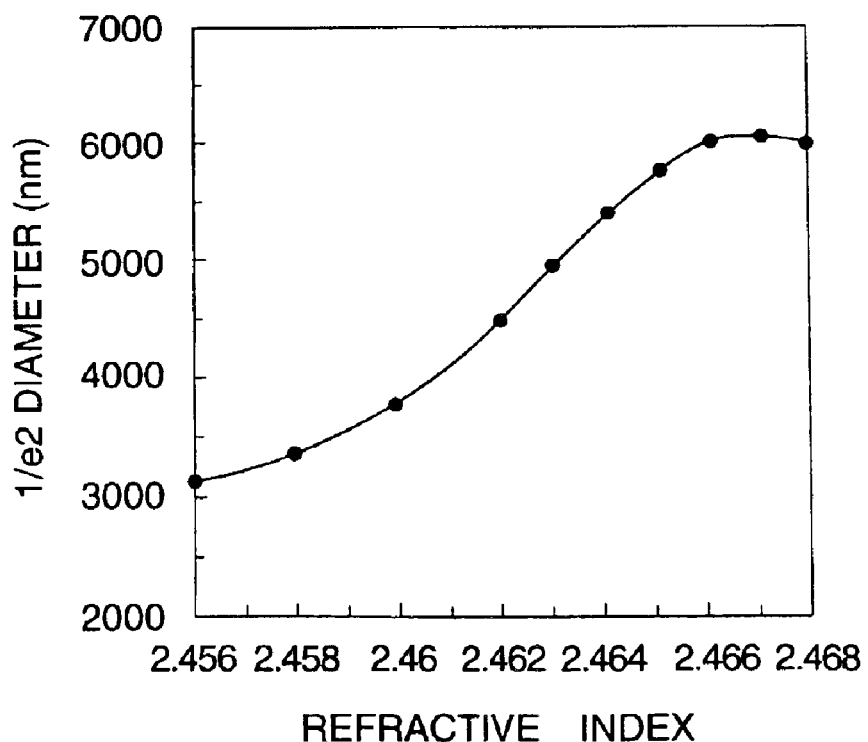
FIG. 3 is another graph illustrating the relationship between the refractive index of the cladding layer and the mode field diameter.

FIG. 3 illustrates another example of anal is of the relationship between the refractive index of the cladding layer 6 and the mode field diameter in the optical waveguide layer 3 which is provided with an 8 $\mu$m wide channel optical waveguide 4, where the greatest thickness of the cladding layer 6 is 5 $\mu$m, over which is an air layer. It is seen that, although the mode field diameter gradually expands as the refractive index of the cladding layer 6 increases, the expansion of the mode field diameter hits a ceiling when the refractive index of the cladding layer 6 reaches about 2.466. Therefore, where the difference in the refractive index between the optical waveguide layer 3 and the cladding layer 6 is kept at 0.001 or more, an expanded mode field diameter can be obtained.

In the region in which this expanded mode field diameter gradually approaches a constant value, i.e. the region which the difference between the optical waveguide layer 3 and the cladding layer 6 in the refractive index is less than 0.001, the optical confinement into the optical waveguide layer 3 is significantly weakened, and the wave guiding mode may turn multiple in the region from the optical waveguide layer 4 to the cladding layer 6 instead of remaining single within the optical waveguide layer. If the wave guiding mode becomes multiple, the coupling loss with the single mode optical fiber will increase, which is undesirable. Therefore, in order to keep the wave guiding mode single among other purposes, it is preferable to keep the difference between the optical waveguide layer 3 and the cladding layer 6 in the refractive index not less than 0.001.

Figure 4:
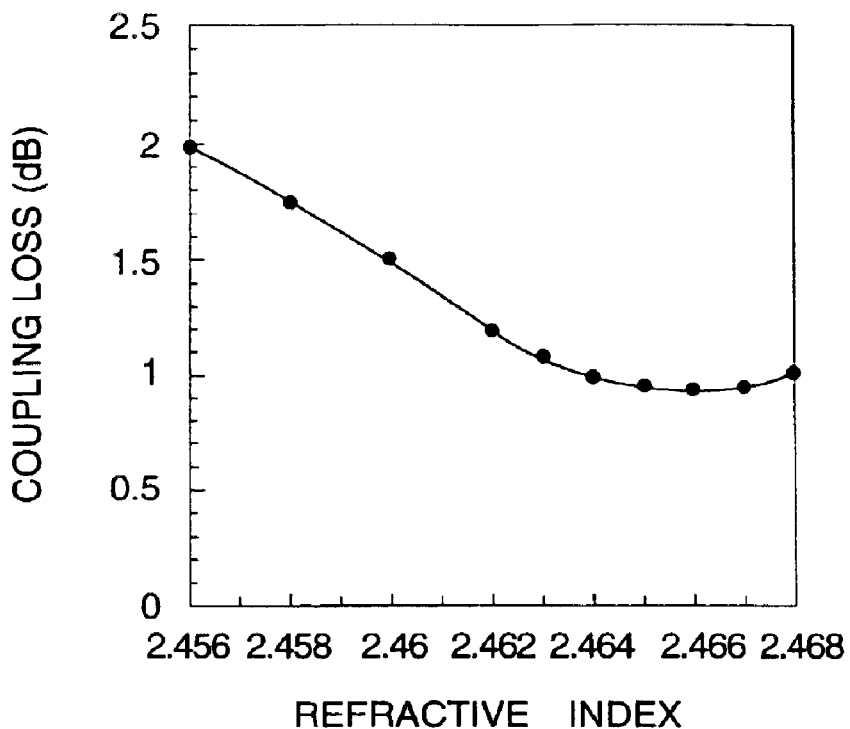
FIG. 4 is a graph illustrating the relationship between the refractive index of the cladding layer and the coupling loss.

FIG. 4 illustrates an example of analysis of the relation between the refractive index of the cladding layer and the coupling loss when the thickness of the cladding layer is 5 $\mu$m and an air layer is provided over it. It is seen that at whichever refractive index, the coupling loss is much less 4.2 dB, which is it level in a absence of the cladding layer, and it is at its lowest level of 0.95 dB in the region where the refractive index of the cladding layer is about 2.466 and the difference between the optical waveguide layer and the cladding layer in the refractive index is 0.002.

Further, the flare length of the cladding layer 6 should preferably be in the range of 50 $\mu$m to 5000 $\mu$m from the viewpoint of proper balance between the radiation loss and the flare size, more preferably in the range of 200 $\mu$m to 2000 $\mu$m. The thickest part of the flare, i.e. the thickness of each end face of the cladding layer (hereinafter referred to as "end face thickness") can be appropriately chosen out of the range of 1 $\mu$m to 10 $\mu$m according to the desired mode field diameter.

Figure 5:
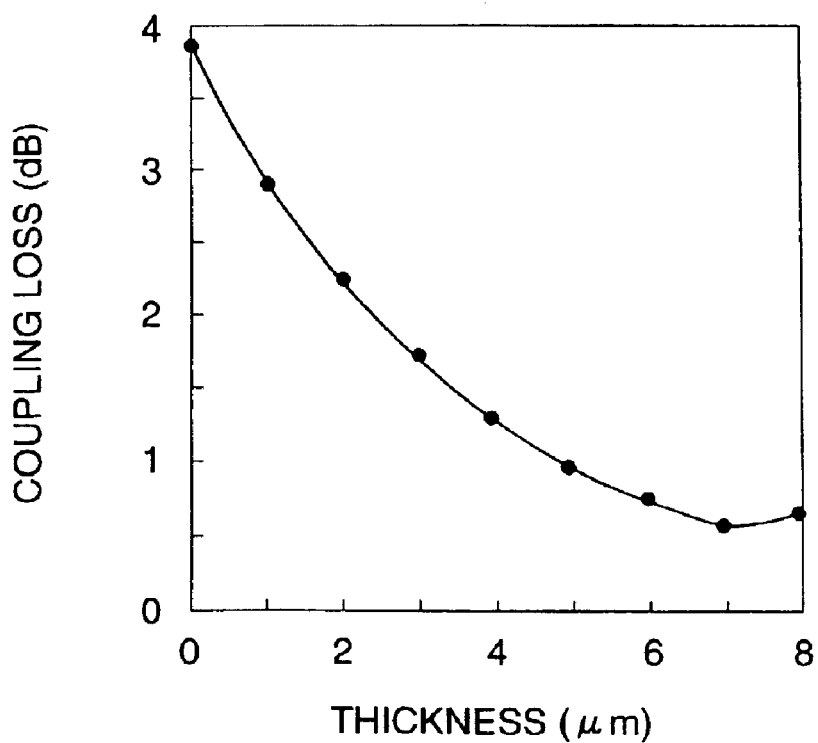
FIG. 5 is a graph illustrating the relationship between the thickness of the cladding layer and the coupling loss.

FIG. 5 illustrates an example of analysis of the relationship between the refractive index of the cladding layer and the coupling loss where the refractive index of the cladding layer 6 is 2.465. The greater the end face thickness of the cladding layer 6, the more the coupling loss is reduced. At an end face thickness of about 7 $\mu$m, the coupling loss is at its lowest, 0.56 dB, but, as the coupling loss lessens to below 1 dB at an end face thickness of 5 μm or less, a suitable end face thickness can be chosen, with the length of time required for production and other factors taken into account.

Figure 6:
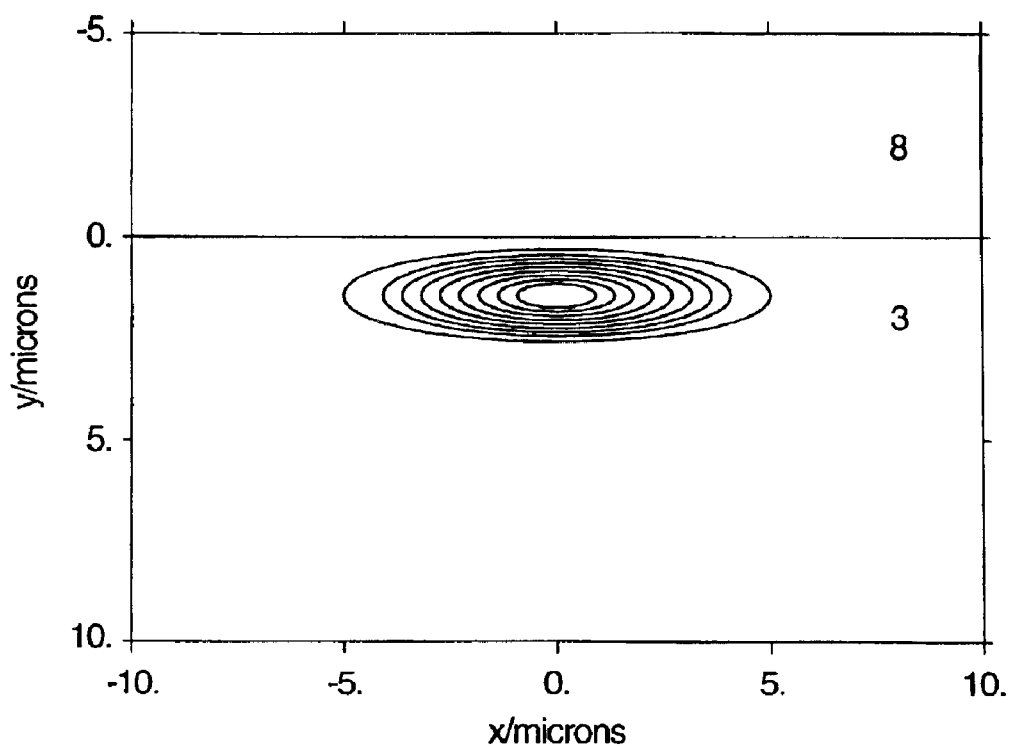
FIG. 6 illustrates a mode profile in a case where no cladding layer is provided.
Figure 7:
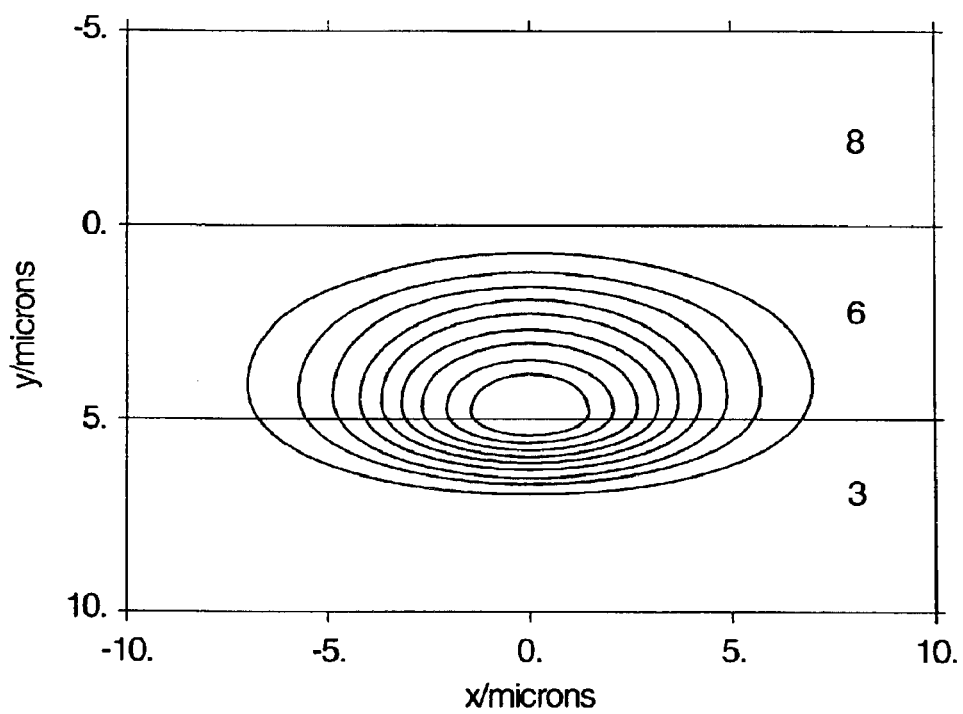
FIG. 7 illustrates a mode profile in a case where a cladding layer is provided.

FIG. 6 illustrates the result of stimulation of a mode profile in a case where no cladding layer is provided over the optical waveguide layer, and FIG. 7, that of a mode profile in another case in which a cladding layer of 5 μm in end face thickness is provided over the optical waveguide layer. The simulation of the mode profiles was carried out by a finite definition method. These results of simulation, too, indicate that providing the cladding layer 6 over the optical waveguide layer 3 serves to expand the mode field diameter. In the drawings, numeral 3 denotes the optical waveguide layer, 6, the cladding layer and 8, the air layer.

Next will be outlined the manufacturing method for the optical waveguide element, which is the embodiment of the invention so far described. This optical waveguide element can be manufactured by forming the buffer layer 2 over the monocrystalline substrate 1, patterning the buffer layer 2 into a prescribed shape, forming the channel optical waveguide 4 by forming an optical waveguide layer 3 over the patterned buffer layer 2, and thereby forming the cladding layer 6 over the optical waveguide layer 3.

In this mode of implementing the invention, the buffer layer, the optical waveguide layer and the cladding layer can be formed by coating the substrate with a solution of a metallic organic compound such as a metallic alkoxide or an organic metallic salt by a wet process such as solation/gelation or MOD process, making the coated films amorphous by heating, and subjecting the resultant to amorphous thin film to further heating for solid phase epitaxial growth to achieve crystallization.

To form the cladding layer 6, for instance, after fabricating a cladding layer made up of an amorphous thin film (hereinafter referred to as an "amorphous cladding layer") over the optical waveguide layer 3 by a wet process, this amorphous cladding layer is etched into a flared shape which varies in thickness, and the amorphous cladding layer formed by further heating into a flared shape is subjected to solid phase epitaxial growth.

To form the channel optical waveguide 4, a buffer layer made up of an amorphous thin film (hereinafter referred to as an "amorphous buffer layer") formed by a wet process over the monocrystalline substrate 1 is patterned into a prescribed shape, the patterned amorphous buffer layer is subjected to solid phase epitaxial growth, and the optical waveguide layer 3 is formed over the epitaxially grown buffer layer 2.

In this manner, subjecting an amorphous thin film which has been formed to solid phase epitaxially can provide a very smooth thin film which is hardly susceptible to scattering loss. Especially where a patterned epitaxial thin film is to be fabricated, patterning of a thin film already made amorphous and subjecting the patterned amorphous thin film to solid phase epitaxial growth can provide very smooth edges, side walls and surface with little scattering loss. This solid phase epitaxial growth process has an additional advantage of permitting ready control of the refractive index of the thin film by adjusting the blending of the precursor to the metallic organic compound that is used in addition to a lower equipment cost and higher uniformity within the substrate face than the products of various vapor phase growth processes.

The metallic vapor compound is selected out of metallic alkoxides or metallic salts, which are the products of reaction between various metals and organic compounds (preferably organic compounds whose boiling point under normal pressure is not lower than 80° C.), but the choice is not limited to these. The organic ligand of any such metallic alkoxide compound is selected out of $R^1O—$ and $R^2OR^3O—$ (where $R^1$ and $R^2$ an aliphatic hydrocarbon groups, and $R^3$, a divalent aliphatic hydrocarbon group which may have an bond).

The metal or compound which is used as a raw material, after being reacted in a prescribed composition with, or dissolved in, a solvent selected from alcohols, diketones, ketonic acids, alkyl esters, oxyacids, oxyketones and acetic acid (desirably a solvent whose boiling point under normal pressure is not lower than 80° C.), is applied over the monocrystalline substrate. Although this metallic organic compound can as well be applied after being hydrolyzed, in order to obtain an epitaxial ferroelectric thin film of satisfactory quality, it is preferable not to perform hydrolysis. Also from the viewpoint of the quality of the thin film that is produced, these reactions should preferably be carried out in an ambiance of dry nitrogen or argon.

A metallic alkoxide compound can be synthesized by out distillation or reflux in a metal-containing organic solvent that can be represented by $R^1OH$ or $R^2OR^3OH$. $R^1$ and $R^2$ represent aliphatic hydrocarbon groups, and preferably should be alkyl groups of 1 to 4 in carbon number. $R^3$ should preferably be an alkylene group of 2 to 4 in carbon number or a divalent group in total carbon number of 4 to 8 in which alkylene groups of 2 to 4 in carbon number are combined by an ether bond.

Of the solvents having a melting point of not lower than 80° C., to be specific, alcohols readily permitting alcohol exchange reactions of metallic alkoxides including, for example, $(CH_3)_2CHOH$ (melting point: 82.3° C.), $CH_3(C_2H_5)CHOH$ (melting point: 99.5° C.), $(CH_3)_2CHCH_2OH$ (melting point: 108° C.), $C_4H_9OH$ (melting point: 117.7° C.), $(CH_3)_2CHC_2H_4OH$ (melting point: 130.5° C.), $CH_3OCH_2CH_2OH$ (melting point: 124.5° C.), $C_2H_5OCH_2CH_2OH$ (melting point: 135° C.) and $C_4H_9OCH_2CH_2OH$ (melting point: 171° C.) are the most preferable, but the choice is not limited to these. $C_2H_5OH$ (melting point: 78.3° C.) and the like can also be used.

The monocrystalline substrate is coated with a solution containing of such metallic organic compounds by a method selected out of spin coating, dipping, spraying, screen printing and ink jet printing. From the viewpoint of the quality of the thin film that is produced, this coating should preferably be carried out in an ambiance of dry nitrogen or argon.

After the substrate is coated with the solution containing a metallic organic compound, by subjecting it as required to a pretreatment of heating at rate of 0.1 to 1000° C./second (desirably at a rate of 1 to 100° C./second) in an oxygen-containing ambiance (desirably in oxygen) to a temperature range of 100° C. to 500° C. (desirably 200° C. to 400° C.) in which no crystallization can take place, the coated layer is thermally decomposed to form an amorphous thin film. This amorphous thin film is further heated in an oxygen-containing ambiance (desirably in oxygen) at a rate of 1 to 500° C./second (desirably at a rate of 10 to 100° C./second) to a temperature range of 500° C. to 1200° C. (desirably 600° C. to 900° C.) to achieve solid phase axial growth of an amorphous ferroelectric thin film from the substrate surface. In this solid phase epitaxial crystallization process, heating is carried out in the above-stated temperature range for 1 second to 24 hours, desirably for 10 seconds to 12 hours. From the viewpoint of the quality of the thin film that is produced, the oxygen ambiance should have been dried for a certain period of time, but it may rather humidified as required.

The thickness of a thin film formed by one round of solid phase epitaxial grow is 10 nm to 1000 nm, desirably 10 nm to 200 nm, and a thin film of a desired thickness can be obtained by repeating the solid phase epitaxial growth. Where the solid phase epitaxial is to be repeated, it is desirable to cool the film at a rate of 0.01 to 100° C./second after each round of epitaxial growth.

For this embodiment of the invention, the amorphous thin film is patterned by etching. Etching of an amorphous in film is quick, can be easily stopped and is well controllable. More specifically, after the surface of the amorphous thin film is coated with a photoresist or an electron-beam resist, the film is patterned by successive exposure, development, etching and resist peeling.

The etching may either be a wet process using an aqueous solution of HCl, $HNO_3$, HF, $H_2SO_4$, $H_3PO_4$, $C_2H_2O_2$ or $NH_4F$ or a mixed aqueous solution of more than one of them or a dry process such as reactive ion etching with $CCl_4$, $CCl_2F_2$ or $CHClFCF_3$ or a gaseous mixture of one or more of them $O_2$, or ion beam etching, but wet etching is more preferable because it permits quick, easy and accurate processing.

Next, the manufacturing method for the optical waveguide element, which is the first embodiment of the invention, in which a PLZT buffer layer 2, a PZT thin film optical waveguide 3 and a PZT cladding layer 6 are formed over the monocrystalline substrate 1 made up of Nb-doped $SrTiO_3$, will be described more specifically.

First as illustrated in FIG. 8A, a PLZT buffer layer 2A having a composition of 2.432 in the refractive index is formed by solid phase epitaxial growth to a thickness of 1400 nm over the Nb-doped $SrTiO_3$ (100) monocrystalline substrate 1 whose refractive index is 2.308 at a wavelength of 1.3 $\mu$m.

Anhydrous lead acetate $Pb(CH_3COO)_2$, lanthanum isopropoxide $La(O—I—C_3H_7)_3$, zirconium isopropoxide $Zr(O-i-C_3H_7)_4$ and titanium isopropoxide $Ti(O-i-C_3H_7)_4$ are used as starting materials and, after dissolving these starting materials in 2-methoxy ethanol this solution is distilled and refluxed. A precursor solution for forming a PLZT buffer layer having a final Pb of 0.6 M and an refractive index of 2.432 was prepared. Next, the surface of washed, etched and dried Nb-doped $SrTiO_3$ (100) monocrystalline substrate 1 was spin-coated with this precursor solution. The coated monocrystalline substrate is heated in an $O_2$ ambiance and held at a temperature of 350° C. and, after it is further at 800° C., is cooled. By this sequence of coating, heating and cooling, the PLZT buffer layer 2A of 1400 nm in thickness is formed by solid phase epitaxial growth.

Then, as illustrated in FIG. 8B, an amorphous PLZT buffer layer 2B whose refractive index is 2.432 is formed to a thickness of 500 nm over the PLZT buffer layer 2A and patterned, and the PLZT buffer layer 2B is formed by solid phase epitaxial growth after the patterning.

The surface of the PLZT buffer layer 2A is spin-coated with the same precursor solution as was used for the formation of the PLZ buffer layer 2A. The coated monocrystalline substrate is heated in an $O_2$ ambiance and, after it is held at 350° C., is cooled. By repeating this sequence of coating, heating and cooling, the amorphous PLZT buffer layer 2B of 500 mm in thickness is formed.

Over the amorphous PLZT buffer layer 2B that is obtained, a photoresist having an opening pattern in which a flared part is connected to each end of a 4 $\mu$m wide linear part is formed. With this photoresist being used as the mask, wet etching with an aqueous solution of HCl is performed to form a linear pattern having a U-shaped cross section in the amorphous PLZT buffer layer 2B. Etching in the depthwise direction is stopped at the surface of the epitaxial PLZT buffer layer 2A. Etching in the widthwise direction can be controlled by extending or reducing the duration of etching because the amorphous PLZT buffer layer 2B under the mask is either under-etched or side-etched. Etching is carried out at an approximate rate of, for instance, 0.1 $\mu$m/minute to 0.5 $\mu$m/minute, and a groove having a U-shaped cross section of 500 nm in depth and 5.0 $\mu$m in width in the linear channel part can be thereby formed. The amorphous PLZT buffer layer 2B in which the U-shaped groove is formed is subjected to solid phase epitaxial growth to obtain the PLZT buffer layer 2B.

Next, as shown in FIG. 8C, a PLZT optical waveguide layer 3 having a composition of 2.468 in the refractive index is formed by solid phase epitaxial growth to a thickness of 200 nm over the PLZT buffer layer 2B.

A solution for the PZT waveguide layer for forming the PZT optical waveguide layer 3 having a composition of 2.468 in the refractive index is prepared in the same manner as the precursor solution for the PLZT buffer layer, and the surface of the PLZT buffer layer 2B is spin-coated with this prescursor solution. The coated monocrystalline substrate is heated in an $O_2$ ambiance and held at a temperature of 350° C. and, after it is further held at 800° C., is cooled. By repeating this sequence of coating, heating and cooling, the PZT optical waveguide layer 3 of 2200 nm in thickness is formed by solid phase epitaxial growth.

Then, as illustrated in FIGS. 8D through 8F, a PZT cladding layer 6 having a composition of 2.466 in the refractive index is formed in a flared shape over the PZT optical waveguide layer 3.

As shown in FIG. 8D, a precursor solution for the PZT cladding layer for forming the PZT cladding layer 6 having a composition of 2.466 in the refractive index is prepared in the same manner as the precursor or solution for the PLZT buffer layer, and the surface of the PZT optical waveguide layer 3 is spin-coated with this precursor solution. The coated monocrystalline substrate is heated in an $O_2$ ambiance and, after it is held at 350° C., is cooled. By repeating this sequence of coat, heating and cooling, an amorphous PZT cladding layer 6Aa of 2500 nm is formed. The surface of this amorphous PZT cladding layer 6Aa is spin-coated with the same precursor solution as what was used for the preparation of the amorphous PZT cladding layer 6Aa. The coated monocrystalline substrate is heated in an $O_2$ ambiance and, after it is held at 250° C., is cooled to form an amorphous PZT cladding layer 6Ab of 200 nm in thickness. This amorphous PZT cladding layer 6Ab, made amorphous at a lower temperature, is easier to etch than the amorphous PZT cladding layer 6Aa and, as etching proceeds from the upper layer side, plays the role of a flare formation facilitating layer by its side etching effect. After that, a photoresist 10 having an opening pattern in a part excluding 3000 $\mu$m from each end of the substrate is formed and, as shown in FIG. 8E wet etching using this photoresist 10 as the mask results in partial side etching of the amorphous PZT cladding layers 6Aa and 6Ab.

As illustrated in FIG. 8F, the surfaces of the partially side-etched amorphous PZT cladding layer 6Aa and 6Ab are spin-coated with the same precursor solution as what was used for the preparation of the amorphous PZT cladding layer 6Aa. The coated monocrystalline is heated in an $O_2$ ambiance and, after it is held at 250° C., is cooled. By repeating this sequence of coating, heating and cooling, an amorphous PZT cladding layer 6Ba of 2500 nm in thickness is formed, and a photoresist 11 having an opening pattern in a part excluding 2000 $\mu$m from each end of the substrate is formed.

Then, as illustrated in FIG. 8G, wet etching of the PZT cladding layer 6Ba with an aqueous solution of HCl using the photoresist 11 as the mask forms the amorphous PZT cladding layer 6Aa, 6Ab and 6Ba in a flared shape as a whole.

Figure 8:
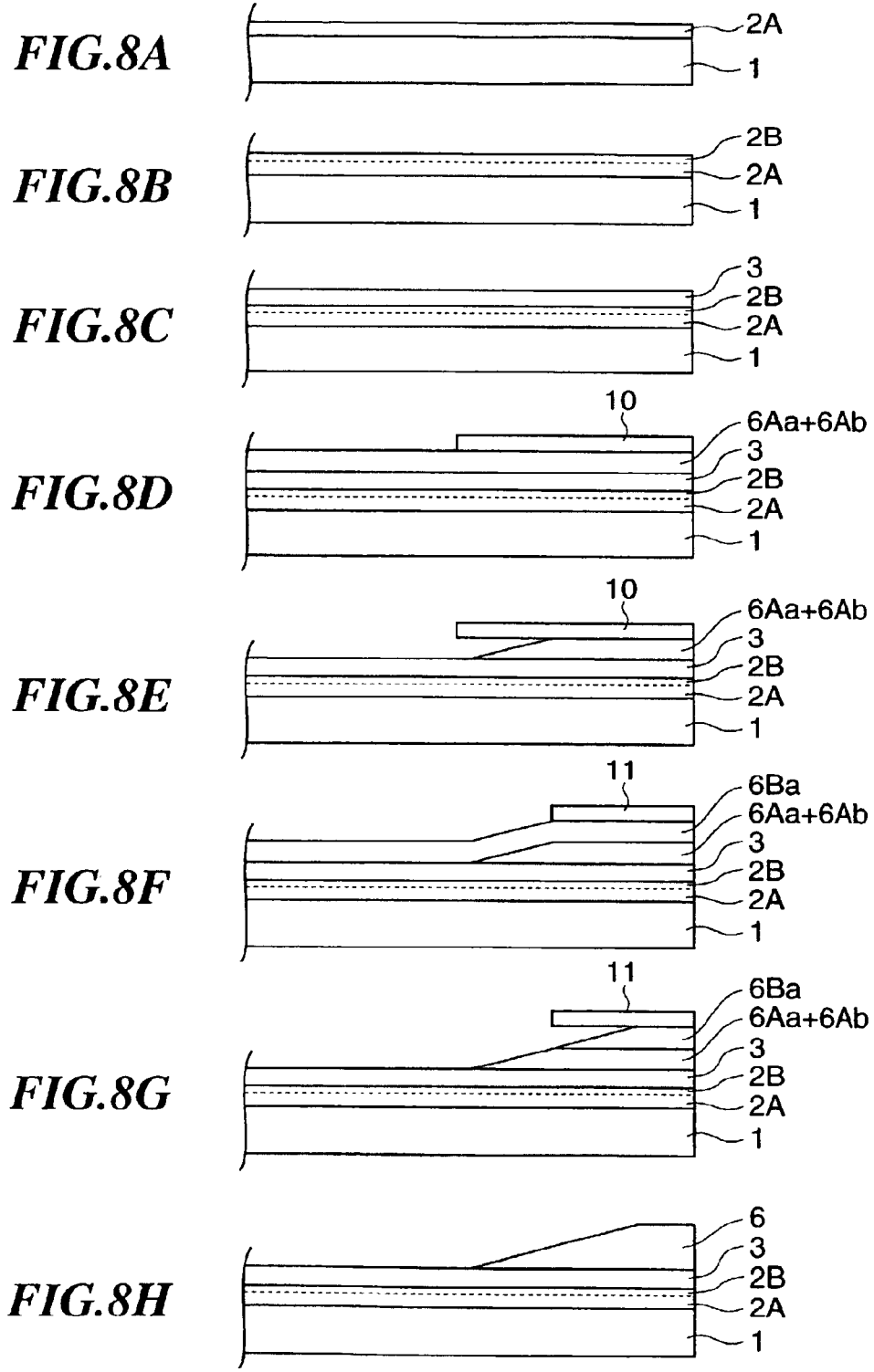
FIGS. 8A through 8H are profiles illustrating the manufacturing process of the optical waveguide element, which is the first embodiment of the invention.

As illustrated in FIG. 8, the amorphous PZT cladding layers 6Aa, 6Ab and 6Ba formed in flared shape are integrated by solid phase epitaxial growth, and formed into a flared cladding layer 6 having an end face thickness of 5 μm and a length of 1000 μm by further cutting and grinding to complete the optical waveguide element.

The optical waveguide element thereby obtained has a structure in which the crystallographic relationship is a single-oriented PZT (100) cladding layer//PZT (100) thin film optical waveguide//PLZT (100) buffer layer//Nb-doped $SrTiO_3$ (100) substrate and the in-plane orientation is PZT [001] cladding layer//PZT[001] thin film optical waveguide//PLZT[001] buffer layer/Nb-doped $SrTiO_3$[001] substrate.

Figure 9:
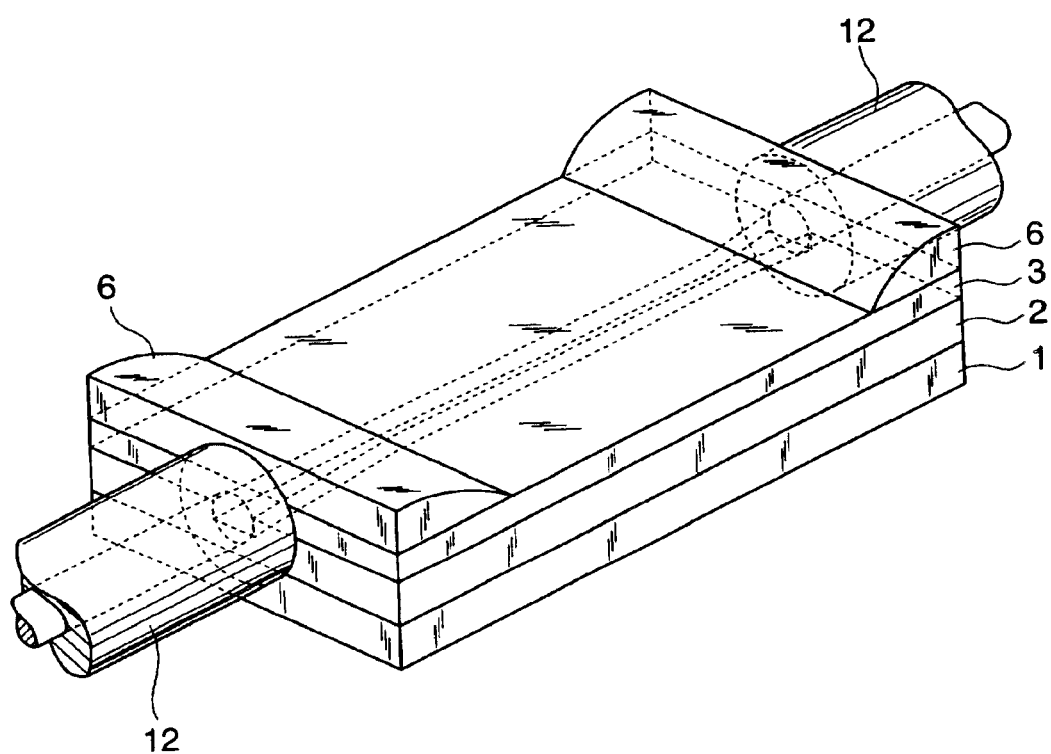
FIG. 9 is a perspective view of a state in which the optical waveguide element, which is the first embodiment of the invention, is coupled with an optical fiber.

As illustrated in FIG. 9, single mode optical fibers 12 were arranged at the incidence and emission ends of the optical waveguide element in this mode of implementing the invention, and the insertion loss between the optical fibers was figured out; by subtracting therefrom the light propagation loss attributable to the channel optical waveguide, the coupling loss between the optical waveguide and the optical fibers was measured. The coupling loss was found to be 1.1 dB, which was confirmed to be much less than the coupling loss of 4.2 dB where there was no flared cladding layer.

Further in this mode of implementation, as the cladding layer is formed by solid phase epitaxial growth after the amorphous thin film is flared by etching, the etching is greater than it would be if an epitaxially grown thin film is etched, and the cladding layer cam be formed accurately in any desired shape.

Further in this mode of implementation, as the channel optical waveguide is formed by solid phase epitaxial growth of the patterned amorphous the film, very smooth edge, side walls and surface can be obtained susceptible to little optical loss due to scattering, and the ruggedness or undulation on the edges of the channel can be easily suppressed to 0.1 μm or even less. As a result, the loss after the subtraction of the light propagation loss of a slab type thin film optical waveguide when a laser beam of 1.3 μm in wavelength is induced from the optical fiber to the incidence end face, in other words the light propagation loss due to the shaping into a channel type, is minimized.

This is likely to be explained by the fact that, because the epitaxial thin film resulting from the crystallization of the amorphous has three-dimensionally arranged fine crystal grains, the crystal grains exposed on the edges become uniform in size, and because the crystal grains exposed on the edges arm uniform in size, no grain boundary is generated to form a groove resulting in extreme smoothness of the edges. Where solid phase epitaxial growth takes place after the amorphous buffer layer and the amorphous optical waveguide layer are stacked, very smooth edges, side walls and surface even less susceptible to optical loss due to scattering are obtained. This seems attributable to the contribution of continuous crystalline growth that takes place between the buffer layer and the optical waveguide layer.

(Second Embodiment)

Figure 10A:
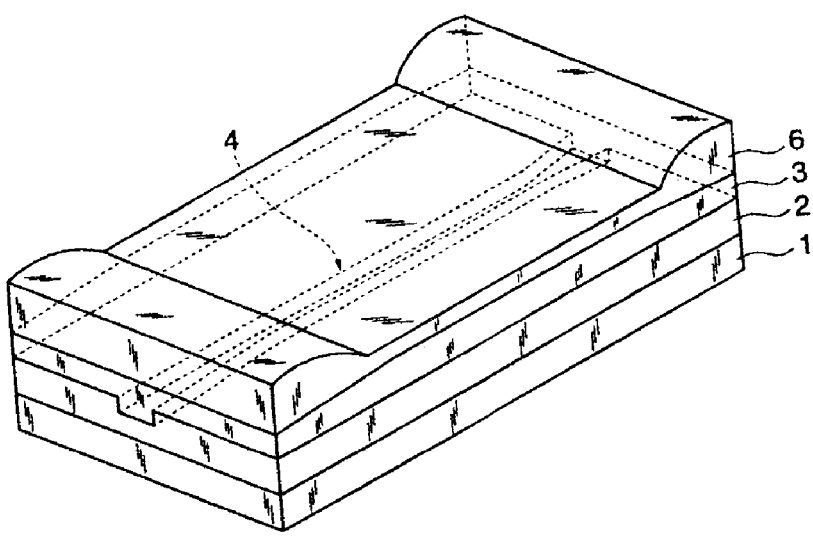
FIG. 10A is a perspective view of an optical waveguide element, which is a second element of the invention, and FIG. 10B, a profile of FIG. 10A.
Figure 10B:
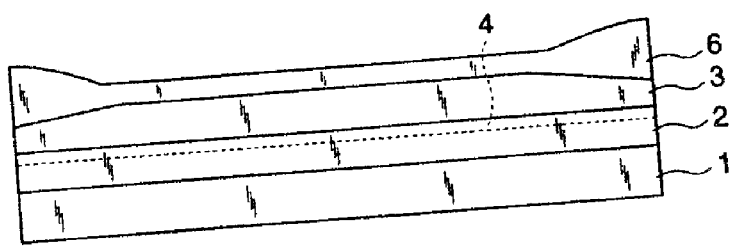

An optical waveguide element, which is the second embodiment of the invention, will be described. As illustrated in FIGS. 10A and 10B, this optical waveguide element has a similar structure to the first embodiment of the invention except that the thickness of the optical waveguide layer is reduced at the incidence end and the emission end and that a cladding layer is provided all over the upper face of the optical waveguide layer, and accordingly description of the same parts, to which respectively the same reference signs are assigned is dispensed with.

All over the upper face of the optical waveguide layer 3, a cladding layer 6 having a smaller refractive index than that of the optical waveguide layer 3 is provided. The thickness of this cladding layer 6 increases towards the end face in a flared shape over the light incidence side of the optical waveguide layer 3, and also increases towards the end face in a flared shape over the light emission side of the optical waveguide layer 3. Further, the thickness of the optical waveguide layer 3 tapers underneath the parts where that of the cladding layer 6 increases in a flared shape. It is preferable for the thickness of the optical waveguide layer to be about ½ of that of the non-tapered part of the optical waveguide layer underneath the parts where to thickness of the cladding layer 6 increases in a flared shape.

Next will be described briefly a specific manufacturing method for the optical waveguide element in this second mode of implementing the invention, in which a PLZT buffer layer 2, a PZT thin film optical waveguide 3 and a PZT cladding layer 6 are formed over a monocrystalline substrate 1 made up of Nb-doped $SrTiO_3$. Details of each step of the process are the same as the corresponding steps in the first mode of implementation.

Figure 11A:
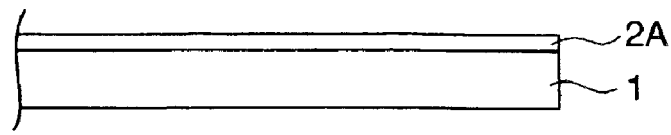
FIGS. 11A through 11H are profiles illustrating the manufacturing process of the optical waveguide element, which is the second embodiment of the invention.

First, as illustrated FIG. 11A, a PLZT buffer layer 2A having a composition of 2.414 in the refractive index is formed by solid phase epitaxial growth to a thickness of 1200 nm over the Nb-doped $SrTiO_3$ (100) monocrystalline substrate 1 whose refractive index is 2.308 at a wavelength of 1.3 μm.

Figure 11B:
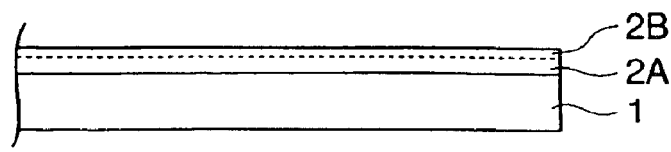
Figure 11C:
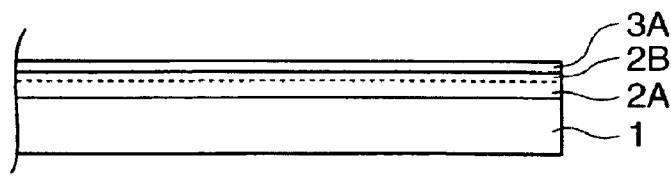

Next, as shown in FIG. 11B, an amorphous PZT buffer layer 2B whose refractive index is 2.414 is formed to a thickness of 300 nm over the PZT buffer layer 2A and, using as the mask a photoresist having an opening pattern in which a flared part is connected to each end of a linear part is formed, wet etching with an aqueous solution of HCl is performed to form a linear pattern having a U-shaped cross section in the amorphous PZT buffer layer 2B. The patterned amorphous PZT buffer layer 2B is subjected to solid phase epitaxial growth to obtain the PZT buffer layer 2B. Then, as shown in FIG. 11C, a PZT optical waveguide layer 3 having a composition of 2.468 in the refractive index is formed by solid phase epitaxial growth to a thickness of 300 nm over the PZT buffer layer 2B.

Figure 11D:
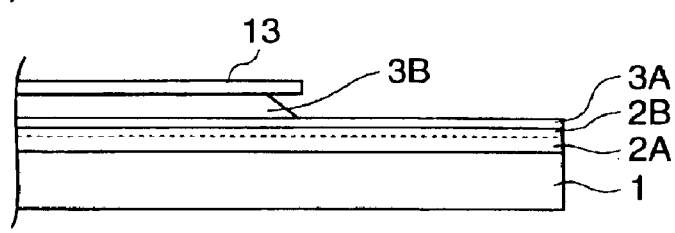
Figure 11E:
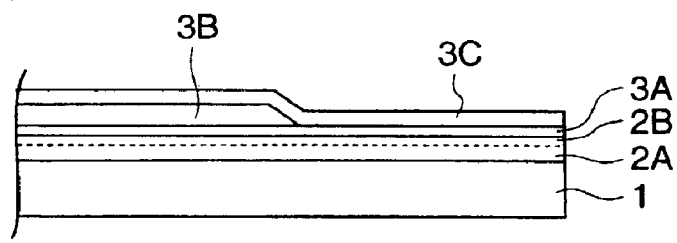

Next, as illustrated in FIG. 11D, an amorphous PZT optical waveguide layer 3B having a composition of 2.468 in the refractive index after epitaxial growth is formed to a thickness of 800 nm over the surface of the PZT optical waveguide layer 3A and, after forming 3000 μm parts near the two ends of the substrate of the amorphous PZT optical waveguide layer 3B, is formed in a tapered shape by etching with a photoresist 13 as the mask, and solid phase epitaxial growth is performed to obtain the PZT optical waveguide layer 3B. After that, as shown in FIG. 11E, a PZT optical waveguide layer 3C having a composition of 2.468 in the refractive index is formed by solid phase epitaxial growth over either the PZT optical waveguide layer 3A or the PZT optical waveguide layer 3B. The PZT optical waveguide layers 3A through 3C are integrated by solid phase epitaxial growth into the PZT optical waveguide layer 3.

Figure 11F:
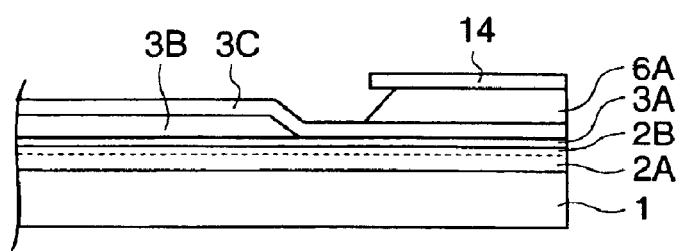
Figure 11G:
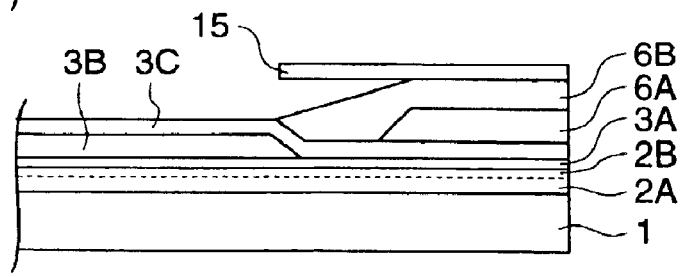
Figure 11H:
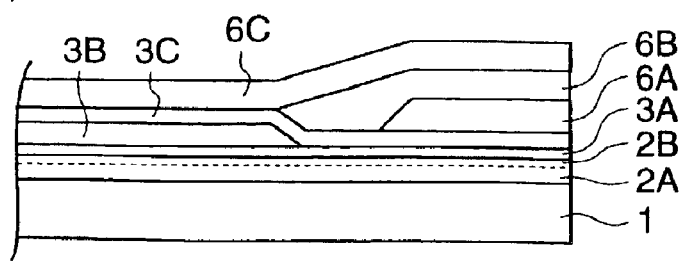

Then, as shown in FIG. 11F, an amorphous PZT clad layer 6A having a composition of 2.477 in the refractive index after epitaxial growth is formed to a thickness of 1000 nm over the surface of the PZT optical waveguide layer 3 and, by wet etching using a photoresist 14 having an opening patter except in about 3000 μm parts from the two ends of the substrate, the amorphous PZT cladding layer is formed in a flared shape. As illustrated in FIG. 11G, a PZT cladding layer 6B is similarly formed by etching a photoresist 15 as the mask over the surface of either the PZT optical waveguide layer 3 or the PZT cladding layer 6A and, as shown in FIG. 11H, a PZT cladding layer 6C having composition of 2.477 in the refractive index is formed by solid phase epitaxial growth to a thickness of 1000 nm over the surface of either the PZT cladding layer 6B or the PZT optical waveguide layer 3C. The PZT cladding layers 6A through 6C are integrated by solid phase epitaxial growth into the PZT cladding layer 6. By further cutting and grinding, it is formed into a flared cladding layer 6 having a length of 1000 μm, with its thickness increasing from 1000 nm to 3000 nm, to complete the optical waveguide element. The thickness of the optical waveguide layer is 800 nm underneath the flared part of the cladding layer and 1600 nm elsewhere.

Single mode optical fibers were arranged at the incidence and emission ends of the optical waveguide element in this mode of implementing the invention, and the insertion loss between the optical fibers was figured out by subtracting therefrom the light propagation loss attributable to the channel optical waveguide, the coupling loss between the optical waveguide and the optical fibers was measured. The coupling loss was found to be 1.0 dB, which was confirmed to be much less than the coupling loss of 4.2 dB where there was no flared cladding layer.

Also, in this mode of implementing the invention, as the thickness of the optical waveguide layer is reduced underneath the flared part of the cladding layer, even though the difference between the optical waveguide layer and the cladding layer in the refractive index is 0.011, i.e., greater than in the first embodiment (where the difference in the refractive index is 0.002), the mode field can be readily expanded, resulting in a substantial reduction in coupling loss.

Further in this mode of implementation, as the cladding layer is formed by solid phase epitaxial growth after the amorphous thin film is flared by etching, the etching is easier than it would be if an epitaxially grown thin film is etched, and the cladding layer can be formed accurately in any desired shape.

Moreover in this mode of implementation, as the channel optical waveguide is formed by solid phase epitaxial growth of the patterned amorphous thin film, very smooth edges, side walls and surface can be obtained hardly susceptible to optical loss due to scattering. The ruggedness or undulation on the edges of the channel can be easily suppressed to 0.1 μm or even less. As a result, the loss after the subtraction of the light propagation loss of a slab type thin film optical waveguide when a laser beam of 1.3 μm in wavelength is introduced from the optical fiber to the incidence end face, in other words the light propagation loss due to the shaping into a channel type, is minimized to a negligible level.

(Third Embodiment)

Figure 12:
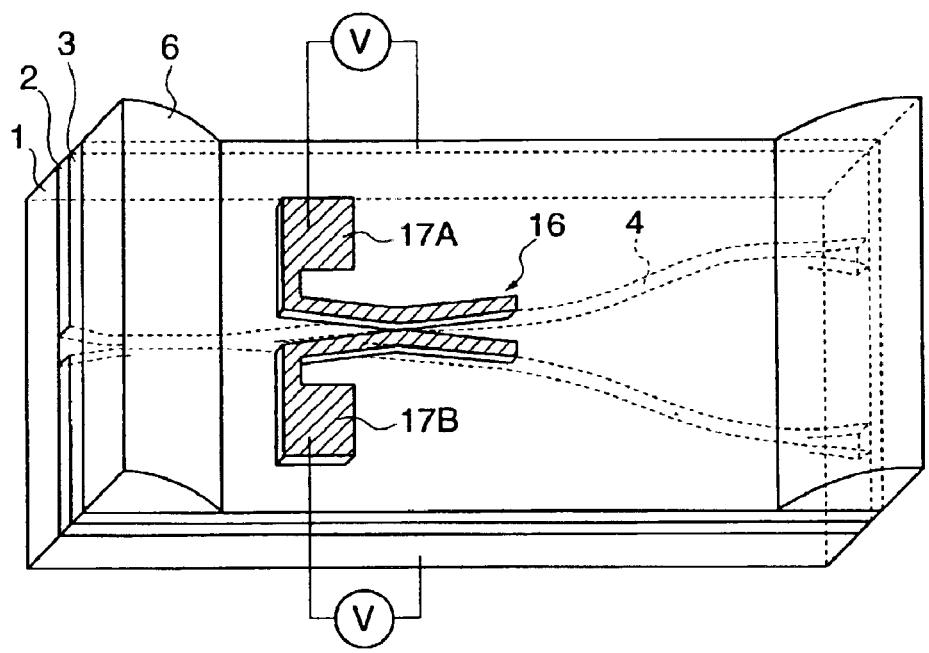
FIG. 12 is a perspective view of the configuration of an optical switching element, which is a third embodiment of the invention.

An optical switching element, which is the third embodiment of the present invention, will be described. As illustrated in FIG. 12, this optical switch element, which is the third embodiment of the invention, is provided with a buffer layer 2 formed over an electroconductive monocrystalline substrate 1 as the lower electrode and an optical waveguide layer 3 formed over the buffer layer 2. In the buffer layer 2, there is formed a recess provided along the lengthwise direction of the monocrystalline substrate 1 and having a Y-branched part 16, and the width of the recess increases in a flared shape towards each end face at the incidence end and the emission end. The optical waveguide layer 3 is provided to fit this recess to from a channel optical waveguide 4.

Over the upper face of the light incidence side and the light emission side the optical waveguide layer 3, a cladding layer 6 having a smaller refractive index than that of the optical waveguide layer 3 and a thickness increasing towards the end face in a flared shape is provided in the same width as the monocrystalline substrate 1. On the downstream side in the light propagating direction of the cladding layer 6, upper electrodes 17A and 17B are provided to be positioned over the Y-branched part 16 of the channel optical waveguide 4, each matching one or the other of the branched channel optical waveguides 4, for controlling the light beam propagating over each channel optical waveguide.

The width of the channel optical waveguide and the thickness and length of the cladding layer are the same as in the first embodiment of the invention.

When single mode optical fibers were arranged on the incident end face and the emission end of this optical switch and a laser beam of 1.3 μm in wavelength is introduced from one of the arranged optical fibers in this mode of implementation, the beam is branded by the Y-branched part 16 to two channel in the same intensities, and distributed to two optical fibers connected to the two port of the emission end face in equal intensities. Next, when a prescribed voltage is applied between the electroconductive monocrystalline substrate 1 as the lower electrode and one of the two upper electrodes 17A and 17B, the laser beam introduced from the incident end face selects in the Y-branched part 16 the channel to which no voltage is applied and whose refractive index has not dropped because the refractive index of the optical waveguide on the voltage-applied side drops, and the optical switching element functioning as a digital switch switches the optical fiber routing.

With respect to this optical switching element in this mode of implementation, too, mode optical fibers were arranged at its incidence and emission ends, and the insertion loss between the optical fibers was figured out; by subtracting therefrom the light propagation loss attributable to the channel optical waveguide, the coupling loss between the optical waveguide and the optical fibers was measured. The coupling loss was found to be 1.0 dB, which was confirmed to be much less than the coupling loss of 4.2 dB where there was no flared cladding layer.

(Fourth Embodiment)

Figure 13:
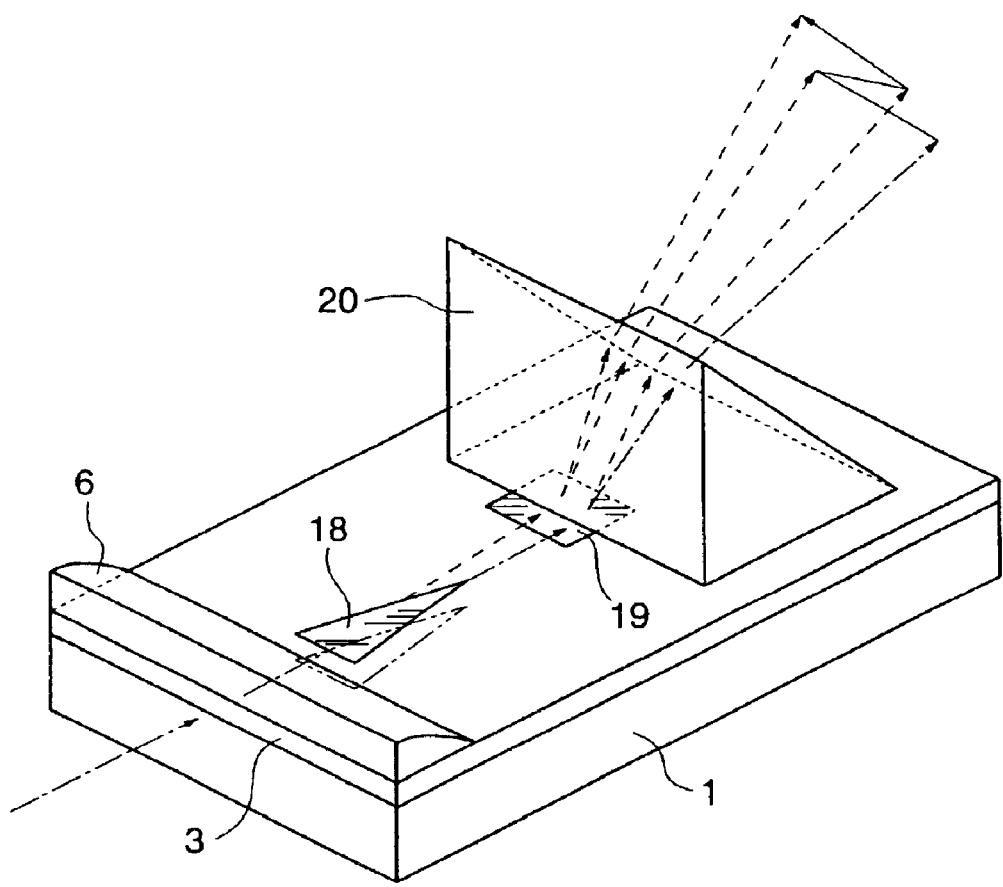
FIG. 13 is a perspective view of the configuration of an optical deflection element, which is a fourth embodiment of the invention.

An optical deflection element, which is the fourth embodiment of the present invention, will be described. As illustrated in FIG. 13, this optical switching element, which is the fourth embodiment of the invention, is provided with an optical waveguide layer 3 formed over an electroconductive monocrystalline substrate 1 as the lower electrode. Over the upper face of the light incidence side of the optical waveguide layer 3 is provided, in the same width as the monocrystalline substrate 1, a cladding layer 6 of which the refractive index is smaller than that of the optical waveguide layer and the thickness increases in a flared shape towards each end. On the downstream side in the light propagating direction of the cladding layer 6, there is provided an upper electrode 18 in a right-angled triangle shape, which is the electrode for controlling the light beam propagating within the channel optical waveguide. Further on the downstream side in the light propagating direction of this upper electrode 18, a rectangularly shaped transparent electrode 19, which is the transparent electrode for controlling the emitted light beam. Over the upper face of this transparent upper electrode 19, a rectangular prism 20 for light emission, having a large bottom area than the area of the transparent upper electrode 19 and a prescribed refractive index is fixed in such a manner that part of the incidence side of the transparent upper electrode 19 be exposed. The thickness and length of the cladding layer are the same as those of the first embodiment of the invention.

In this optical deflection element, when a voltage is applied between the upper electrode 18 and the electroconductive monocrystalline substrate 1, a prismatic region, which differs from the surrounding regions in the refractive index, is formed in the part between the two electrodes, and the light beam is deflected by this prismatic region. When a voltage is applied between the transparent upper electrode 19 and the electroconductive monocrystalline substrate 1, a region, which differs from the surrounding regions in the refractive index, is formed in the part between the two electrodes, and the light beam is deflected by this region, and the light beam is emitted from the rectangular prism 20 for light emission at a prescribed angle of emission.

With respect to this optical deflection element in this mode of implementation, too, single mode optical fibers were arranged at its incidence and emission ends, and the insertion loss between the optical fibers was figured out; by subtracting therefrom the light propagation loss attributable to the channel optical waveguide, the coupling loss between the optical waveguide and the optical fibers was measured. The coupling loss was found to be 1.0 dB, which was confirmed to be much less than the coupling loss of 4.2 dB where there was no flared cladding layer.

Figure 14A:
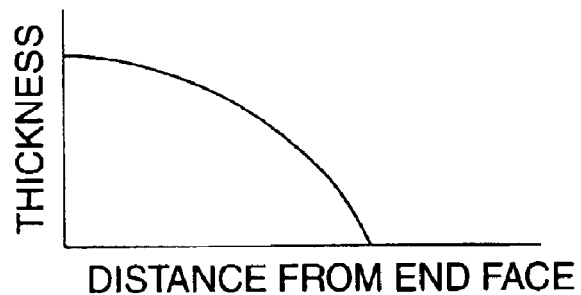
FIGS. 14A through 14D illustrates variations of the flare structure.
Figure 14B:
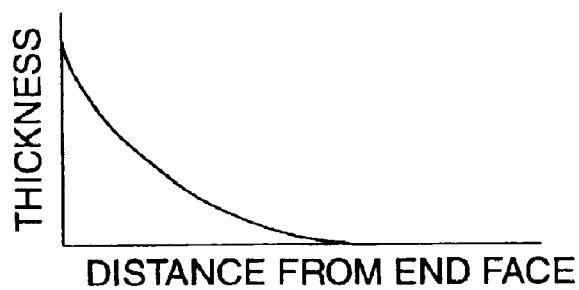
Figure 14C:
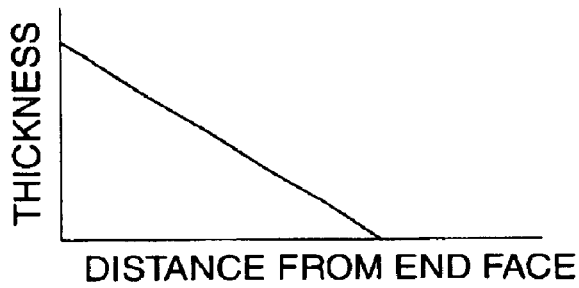
Figure 14D:
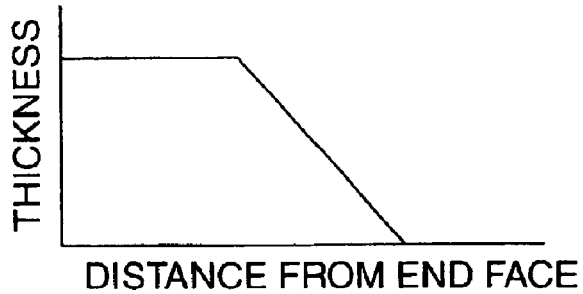

Regarding these first through fourth embodiments of the invention, as illustrated in FIG. 14A, instances in which the thickness of the cladding layer increases in a flared shape generating an upward convex curve, but it may also increase in a downward convex curve as shown in FIG. 14B, or it may as well linearly as in FIG. 14C. It is also sufficient for the end face thickness to be the greatest thickness of the cladding layer, so that the thickness may be constant in a prescribed extent of the end part as shown in FIG. 14D.

Regarding the first through third embodiments, cases in which a channel optical waveguide of a prescribed pattern is provided we described, but the fine pattern of the channel waveguide can as well be linear, S-shaped, Y-branched, crossed or a combination of some of these, and a channel optical waveguide of a desired pattern can be selected to best fit the purpose. Further, although the channel width is supposed to increase from the incidence end towards the emission end in these cladding layer 6. By further cutting and grinding, it is formed into a flared cladding embodiments, it is also possible to leave the channel width as it is instead of increasing it.

Figure 15:
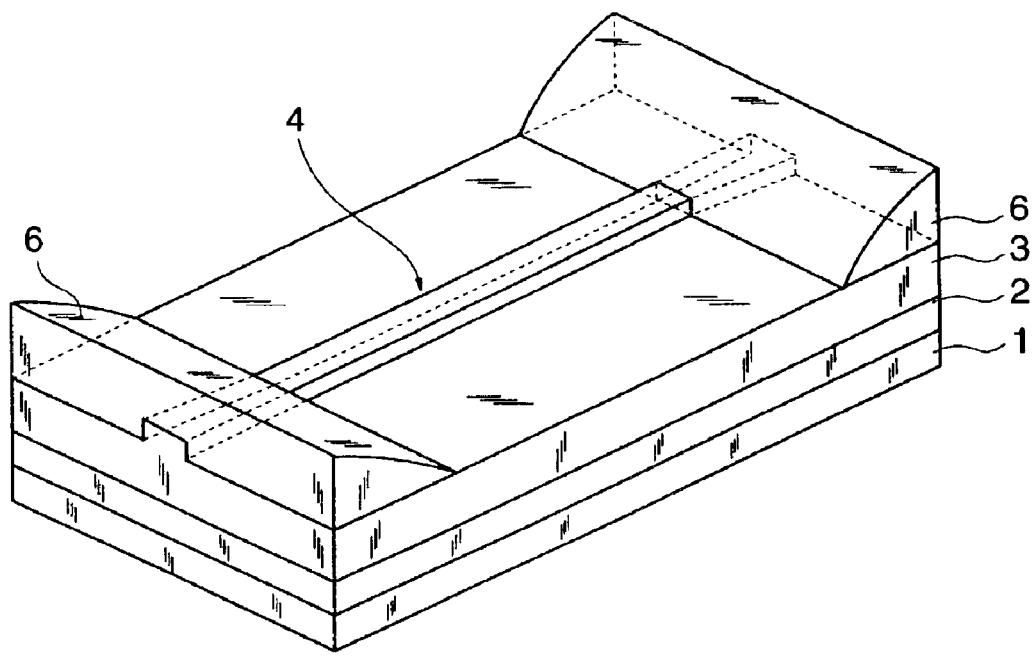
FIG. 15 is a perspective view of a variation of the optical waveguide element, which is the first embodiment of the invention.
Figure 16:
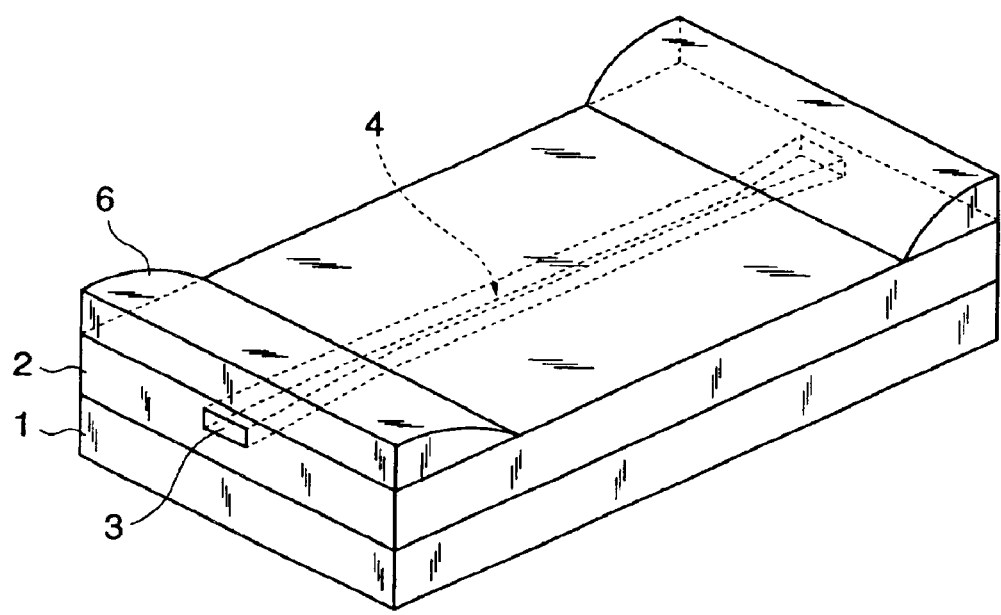
FIG. 16 is a perspective view of another variation of the optical waveguide element which is the first embodiment of the invention.

Regarding the first through third embodiments, instances in which a channel optical waveguide structure whose buffer layer has a recess is to be formed were described, a channel optical waveguide structure having a convex part in the optical waveguide layer as illustrated in FIG. 15 or a channel optical waveguide structure having a rectangular cross section as illustrated in FIG. 16, for instance, is also acceptable, and the channel optical waveguide structure may also be embedded, ridged, rib-shaped or the like. The width, height and depth of the channel can be optimized depending on the choice of the switching system, i.e. whether for example, a Mach-Zehnder interference switch, a directional coupling switch, a total reflection switch, a Bragg reflection switch or a digital switch is used, or depending on the curvature of the curved channel waveguide, the material of the waveguide or the fabrication process. Incidentally, it is preferable to provide an offset as required to reduce the light propagation loss between S-shaped channel optical waveguides different in the direction of curvature or between an S-shaped channel optical waveguide and a linear channel optical waveguide.

Although cases of using Nb-doped $SrTiO_3$ as the material of the monocrystalline substrate are described regarding the first and second embodiments, the material for the monocrystalline substrate can be selected from such other oxides as $SrTiO_3$, Nb-doped $SrTiO_3$, La-doped $SrTiO_3$, $BaTiO_3$, $BaZrO_3$, $LaAlO_3$, $ZrO_2$, $Y_2O_3 8\%$-$ZrO_2$, $MgO$, $MgAl_2O_4$, $LiNbO_3$, $LiTaO_3$, $Al_2O_3$, $ZnO$, Al-doped $ZnO$, $In_2O_3$, $RuO_2$, $BaPbO_3$, $SrRuO_3$, $YBa_2Cu_3O_{7-x}$, $SrVO_3$, $LaNiO_3$, $La_{0.5}Sr_{0.5}CoO_3$, $ZnGa_2O_4$, $CdGa_2O_4$, $Mg_2TiO_4$ and $MgTi_2O_4$. Of these, $SrTiO_3$, Nb-doped $SrTiO_3$ and La-doped $SrTiO_3$, at least $SrTiO_3$ is preferable as the oxide material for the substrate.

Regarding the first and second embodiments, instances in which an optical waveguide layer made up of PZT were described, but the material for the optical waveguide layer can be selected from various electro-optical materials including $ABO_3$ type perovskite ferroelectrics. Available tetragonal, trigonal, rhombic or pseudo-cubic materials include, for example, $BaTiO_3$, $PbTiO_3$, $Pb_{1-x}La_x(Zr_yTi_{1-y})_{1-x/4}O_3$ ($0<x<0.3$, $0<y<1.0$); PZT, PLT or PLZT depending on the values of x and y), $Pb(Mg_{1/3}Nb_{2/3})O_3$ and $KNbO_3$. Available hexagonal or trigonal materials include, for instance, ferroelectrics such as $LiNbO_3$ and $LiTaO_3$ and products of their Ti diffusion or proton exchange. Available tungsten-bronze type materials include $Sr_xBa_{1-x}Nb_2O_6$ and $Pb_xBa_{1-x}Nb_2O_6$ and, in addition to them there are also $Bi_4Ti_3O_{12}$, $Pb_2KNb_5O_{15}$, $K_3Li_2Nb_5O_{15}$ and the substitution derivatives mentioned above. Available magneto-optic materials include $Y_3Al_6O_{12}$, $Y_3Fe_5O_{12}$ and $Y_3Ga_5O_{12}$ and light amplifying materials obtained by doping these with Er, Nd or Pr. Incidentally, materials that can constitute an optical waveguide layer are not limited to the examples cited above.

Regarding the first and second embodiments, although cases in which an amorphous buffer layer formed over a monocrystalline substrate is patterned into a prescribed shape, and the patterned amphorous buffer layer is subjected to solid phase epitaxial growth, and an optical wave layer is formed over the epitaxially grown epitaxial buffer layer to form a channel optical waveguide were described, the channel optical waveguide may as well be formed by some other method. For instance, it is also possible to form an epitaxial buffer layer over the monocrystalline substrate and pattern it into a prescribed shape, and form an optical waveguide layer over the patterned epitaxial buffer layer to obtain a channel optical waveguide.

Regarding the first and second embodiments, cases in which the amorphous thin film is formed by a wet process such as a sol/gel method or an MOD method, but the amorphous thin film may as well be formed by a vapor phase growth method selected out of electron beam vapor deposition, flash vapor deposition, ion plating, Rf-magnetron sputtering ion beam sputtering, laser abrasion, MBE, CVD, plasma CVD and MOCVD, or by a wet process such as a sol/gel method or an MOD method.

Regarding the third and fourth embodiments, although cases in which the invention is applied to an optical deflection element and an optical switching element were described, it can also be applied to optical waveguide elements in general including optical modulation elements and optical filter elements.

The optical waveguide element, optical switching element and optical deflection element according to the present invention, because they have a cladding layer having a smaller refractive index than that of the optical waveguide layer over the optical waveguide, allow the mode field diameter in the optical waveguide to be expanded, the coupling loss between the optical fiber and the optical waveguide element to be substantially reduced and, moreover, permit the light propagation loss within the optical waveguide element to be reduced because the cladding layer is so shaped that its thickness increases in a flared shape towards the end over at least one of the incidence end and the emission end of the optical waveguide, resulting in high efficiency of coupling with optical fibers.

Further, by the manufacturing method for optical waveguide elements according to the invention, because a flared cladding layer is formed by solid phase epitaxial growth after the amorphous thin film is shaped, the cladding layer can be shaped more easily than when a thin film formed by solid phase epitaxial growth is shaped, resulting in the advantage of making possible the manufacture of optical waveguide elements capable of coupling with optical fibers at higher efficiency and accuracy.

The entire disclosure of Japanese Patent Application No. 2000-073042 filed on Mar. 15, 2000 including specification, claims, drawings and abstract is incorporated herein by reference in its entirety.

What is claimed is:

1. An optical waveguide element comprising:
   an optical waveguide layer having optical waveguide, and
   a cladding layer which is provided over at least one of an incidence end and emission end of the optical waveguide layer, the cladding layer having an outer surface that curves outward until an end portion of the outer surface corresponds to the at least one of an incidence end and emission end of the optical waveguide layer,
   wherein the optical waveguide element has parts gradually decreasing in thickness on the at least one of an incidence end an emission end of the optical waveguide layer.

2. An optical waveguide element manufacturing method for manufacturing an optical waveguide element, the optical waveguide element comprising:
   an optical waveguide layer having optical waveguide, and
   a cladding layer which is provided over at least one of an incidence end and emission end of the optical waveguide on the surface of the optical waveguide layer, has a lower refractive index than that of the optical waveguide layer, and has an outer surface that curves outward,
   the method comprising the steps of:
      forming, over the surface of an optical waveguide layer provided with an optical waveguide, an amorphous thin film whose refractive index is smaller than that of the optical waveguide layer;
      shaping the amorphous thin film over at least one of an incidence end and emission end of the optical waveguide to have the outer surface that curves outward until an end portion of the outer surface corresponds to the at least one of an incidence end and emission end of the optical waveguide layer; and
      forming the shaped amorphous thin film into a cladding layer by solid phase epitaxial growth.

3. An optical waveguide element manufacturing method according to claim 2, comprising the steps of:
   forming a resist film having a specific opening pattern over the amorphous thin film; and
   sharing the amorphous thin film by etching with the resist film to increase its thickness towards the at least one end in a flared shape.

4. An optical waveguide element manufacturing method according to claim 3, comprising the step of:
   forming, between the amorphous thin film and the resist film, a layer for accelerating forming of a thickness-increasing portion of the amorphous thin film, the layer being etched faster than the amorphous thin film.

5. An optical waveguide element manufacturing method according to claim 3, wherein the etching is wet etching.

6. An optical waveguide element manufacturing method according to claim 2, wherein the solid phase epitaxial growth is accomplished by:
   coating the optical waveguide layer with a solution of a metallic organic compound to form a coating film;
   changing the coating film to an amorphous thin film by heating; and
   crystallizing the amorphous thin film by heating.

7. A manufacturing method for manufacturing a channel optical waveguide element, the channel optical waveguide element comprising:
   an optical waveguide layer having an optical waveguide, and
   a cladding layer which is provided over at least one of an incidence end and emission end of the optical waveguide on the surface of the optical waveguide layer, has a lower refractive index than that of the optical waveguide layer, and has an outer surface that curves outward,
   the method comprising the processes of:
      forming an optical waveguide; and
      forming a cladding layer,
      wherein the optical waveguide forming process comprises the steps of:
         shaping an amorphous thin film formed over the surface of a monocrystalline substrate into a pre-determined channel pattern;
         forming a buffer layer by subjecting the amorphous thin film so shaped to solid phase epitaxial growth; and
         forming a channel optical waveguide by solid phase epitaxial growth of an optical waveguide layer over the buffer layer, and
      the cladding layer forming process comprises:
         forming, over the surface of the optical waveguide layer provided with the optical waveguide, an amorphous thin film whose refractive index is smaller than that of the optical waveguide layer;
         shaping the amorphous thin film over at least one of an incidence end and emission end of the optical waveguide to have the outer surface that curves outward until an end portion of the outer surface corresponds to the at least one of an incidence end and emission end of the optical waveguide layer; and
         forming the cladding layer by subjecting the amorphous thin film so shaped to solid phase epitaxial growth by heating.

8. An optical waveguide element manufacturing method according to claim 7, wherein the solid phase epitaxial growth is accomplished by:
   coating the optical waveguide layer with a solution of metallic organic compound to form a coating film;
   changing the coating film to an amorphous thin film by heating; and
   crystallizing the amorphous thin film by heating.

9. An optical deflection element comprising:

an optical waveguide layer having an epitaxial or single-oriented electro-optical effect, the layer being provided over an electroconductive or semi-electroconductive monocrystalline substrate to serve as a lower electrode or over a substrate over the surface of which is formed an electroconductive or semi-electroconductive monocrystalline substrate to serve as a lower electrode;

a light beam controlling electrode which is arranged over the optical waveguide layer and forms, between the optical waveguide layer and the monocrystalline substrate or the monocrystalline thin film, a region having a refractive index varying with the voltage applied and deflecting a light beam which propagates through the optical waveguide layer according to the voltage applied; and a cladding layer which is formed over at least one of an incidence end and emission end of the optical waveguide over the surface of the optical waveguide layer and has a smaller refractive index than that of the optical waveguide layer, and has an outer surface that curves outward until an end portion of the outer surface corresponds to the at least one of an incidence end and emission end of the optical waveguide layer.

10. An optical switching element comprising:

an optical waveguide layer having an epitaxial or single-oriented electro-optical effect, the layer provided over an electroconductive or semi-electroconductive monocrystalline substrate to serve as a lower electrode or over a substrate over the surface of which is formed an electroconductive or semi-electroconductive monocrystalline substrate to serve as a lower electrode;

an optical waveguide formed in the optical waveguide and having at least one branch part;

upper electrodes one of which is provided or for each branch of the branch part; and a cladding layer which is formed over the at least one of an incidence end and emission end of the optical waveguide over the surface of the optical waveguide layer and has a smaller refractive index than that of the optical waveguide layer, and has an outer surface that curves outward until an end portion of the outer surface corresponds to the at least one of an incidence end and emission end of the optical waveguide layer.

* * * * *